United States Patent [19]
DuCharme et al.

[11] 3,903,084
[45] Sept. 2, 1975

[54] CARBOXIMIDOYL UREA DERIVATIVES

[75] Inventors: Donald W. DuCharme, Cooper Twp., Kalamazoo County; Louis L. Skaletzky, Kalamazoo, both of Mich.

[73] Assignee: The Upjohn Company, Kalamazoo, Mich.

[22] Filed: Feb. 11, 1974

[21] Appl. No.: 441,397

[52] U.S. Cl. .......... 260/247.2 A; 260/239 BF; 260/243 B; 260/268 R; 260/268 TR; 260/268 H; 260/293.56; 260/293.71; 260/293.77; 260/295 E; 260/326.42; 260/553 R; 260/553 A; 424/244; 424/248; 424/250; 424/263; 424/322
[51] Int. Cl.² .................................. C07D 295/04
[58] Field of Search... 260/247.2 A, 268 R, 268 TR, 260/243 B, 293.56

[56] References Cited
OTHER PUBLICATIONS
C. A. Vol. 38 15083, 1945.
C. A. Vol. 71 p. 124233p, 1969.

*Primary Examiner*—Robert Gerstl
*Assistant Examiner*—Paul Killos
*Attorney, Agent, or Firm*—Martin B. Barancik; Roman Saliwanchik

[57] ABSTRACT

Novel compounds of the formula below are useful for the treatment of arrhythmic situations in mammals and are compounded into pharmaceutical compositions for systemic administration.

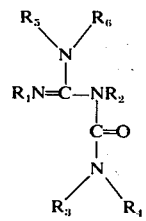

13 Claims, No Drawings

CARBOXIMIDOYL UREA DERIVATIVES

BRIEF DESCRIPTION OF THE INVENTION

It has been discovered that novel compounds of FIG. 1 are useful in the treatment of arrhythmic situations in mammals. Additionally, the compounds of this invention show diuretic activity. The compounds are formulated with pharmaceutical carriers into pharmaceutical compositions for oral and parenteral means of administration for anti-arrhythmic and diuretic uses.

DETAILED DESCRIPTION OF THE INVENTION

In accordance with this invention there are provided a group of compounds, hereafter referred to as Group A, of formula 1

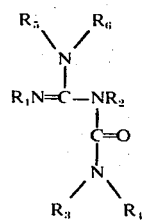
(1)

wherein
$R_1$ and $R_2$ are the same or different and are selected from the group consisting of alkyl of from one to eight carbon atoms, inclusive, cycloalkyl of from five to eight carbon atoms, inclusive, adamantyl, phenalkyl wherein alkyl is from one to three carbon atoms, inclusive, phenyl and mono or di-substituted phenyl or phenyl moiety of the phenalkyl wherein the substituent is the same or different and is selected from the group consisting of alkyl of from one to three carbon atoms, inclusive, halogen, trifluoromethyl, and alkoxy of from one to three carbon atoms, inclusive;
$R_3$ and $R_4$ are the same or different and are selected from the group consisting of hydrogen, alkyl of from one to six carbon atoms, inclusive, cycloalkyl of from five to eight carbon atoms, inclusive, and when taken together with the nitrogen atom to which they are attached, form a saturated heterocyclic ring

wherein Y is selected from the group consisting of methylene, NA, wherein N is nitrogen and A is selected from the group consisting of hydrogen and alkyl of one to three carbon atoms, inclusive, oxygen, and sulfur wherein when Y is methylene,

has from four to six ring carbon atoms, inclusive, and when Y is selected from the group consisting of NA, oxygen and sulfur,

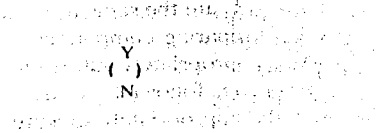

is respectively piperazino, N-alkylpiperazino, morpholino and thiomorpholino, with the further proviso that said carbon ring of

is unsubstituted or monosubstituted with alkyl of from one to three carbon atoms, inclusive;
$R_5$ and $R_6$, when taken together with the nitrogen atom to which they are attached, form a saturated heterocyclic ring,

wherein W is selected from the group consisting of methylene, NA, as previously defined, oxygen and sulfur, and when W is methylene,

has from four to six ring carbon atoms, inclusive, and when W is selected from the group consisting of nitrogen, NA as previously defined, oxygen and sulfur,

is respectively piperazino, N-alkylpiperazino, morpholino, and thiomorpholino, with the further proviso that the carbon ring of

is unsubstituted or monosubstituted with an alkyl of from one to three carbon atoms, inclusive, and pharmaceutically acceptable acid addition salts thereof.

Another group of compounds, hereafter referred to as Group B, are compounds where $R_1$ and $R_2$ are the same or different and are selected from the group consisting of alkyl of from four to six carbon atoms, inclusive, cycloalkyl of from five to seven carbon atoms, inclusive, adamantyl, phenalkyl wherein the alkyl is from one to three carbon atoms, inclusive, phenyl, mono or di-substituted phenyl or phenyl moiety of the phenalkyl group wherein the substituent is the same or different and is selected from the group consisting of alkyl of from one to three carbon atoms, inclusive, halogen, trifluoromethyl, and alkoxy with one to three carbon atoms, with the proviso that when $R_1$ is phenyl, phenalkyl or mono or di-substituted phenyl or phenyl moiety of the aralkyl, then $R_2$ is selected from the group consisting of alkyl of from four to six carbon atoms, inclusive, cycloalkyl of from five to seven carbon atoms, inclusive, and adamantyl.

$R_3$, $R_4$, $R_5$ and $R_6$ are as defined above in Group A.

A further group of compounds, hereafter referred to as Group C, are wherein $R_1$ and $R_2$ are the same or different and are selected from the group consisting of cycloalkyl of from five to seven carbon atoms, inclusive, adamantyl and phenalkyl wherein the alkyl group has from one to three carbon atoms, inclusive, with the proviso that when $R_1$ is phenalkyl, $R_2$ is selected from the group consisting of cycloalkyl of from five to seven carbon atoms, inclusive, and adamantyl.

$R_3$, $R_4$, $R_5$ and $R_6$ are as defined above in Group A with the proviso that when a saturated heterocyclic ring is established with the nitrogen, the ring carbon atoms are unsubstituted.

Another group of compounds, hereafter referred to as Group D, are compounds wherein $R_1$ and $R_2$ are the same or different and are selected from the group consisting of cycloalkyl of from five to seven carbon atoms, inclusive, and adamantyl;

$R_3$ and $R_4$ are selected from the group consisting of alkyl of one to four carbon atoms, inclusive, cycloalkyl of five to seven carbon atoms, inclusive, and when taken together with the nitrogen atom to which they are attached, form a saturated heterocyclic ring

wherein

is selected from the group consisting of piperidino, piperazino, N-alkylpiperazino, alkyl of one to three carbon atoms, inclusive, morpholino and thiomorpholino;

$R_5$ and $R_6$, when taken together with the nitrogen atom to which they are attached, form the saturated heterocyclic ring,

wherein

is selected from the group consisting of piperidino, piperazino, N-alkylpiperazino, morpholino and thiomorpholino.

Preferred compounds are 3-tert-butyl-1-cyclohexyl-1-(N-cyclohexyl-4-morpholinecarboximidoyl)urea and hydrochloride.

1-cyclohexyl-1-(N-cyclohexyl-4-morpholinecarboximidoyl)-3-methylurea and hydrochloride.

1-cyclohexyl-1-(N-cyclohexyl-4-morpholinecarboximidoyl)-3,3-dimethylurea,

N-cyclohexyl-N-(N-cyclohexyl-4-morpholinecarboximidoyl)-1-pyrrolidinecarboxamide and sulfate.

As employed in the above disclosure and throughout the specification, the term "halogen" includes fluorine, chlorine, bromine, and iodine. The term "alkyl" includes methyl, ethyl, propyl and isomers thereof, when limited to three carbon atoms. When limited to a higher number of carbon atoms, the term encompasses compounds through that number of carbon atoms and isomers thereof. The term "adamantyl" includes 1-adamantyl and 2-adamantyl. "Pharmaceutically acceptable acid addition salts" include the hydrochloric, hydrobromic, hydriodic, nitric, sulfuric, phosphoric, acetic, lactic, citric, succinic, benzoic, salicyclic, palmitic, cyclohexanesulfamic and the like. "Cycloalkyl" of from five to eight carbon atoms includes cyclopentyl, cyclohexyl, cycloheptyl, and cyclooctyl.

The compounds of this invention can be prepared by methods known in the art. For example, an appropriately substituted carbodiimide (II) is reacted under suitable conditions with an appropriately substituted amine (III) to form a guanidine (IV).

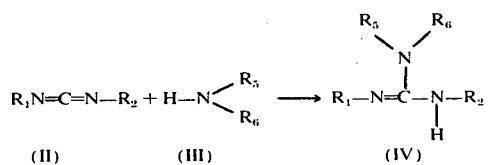

In order to make compounds of the invention where $R_3$ is hydrogen and $R_4$ other than hydrogen, the guanidine is reacted with an appropriately substituted isocyanate (V) to form the compounds of the invention.

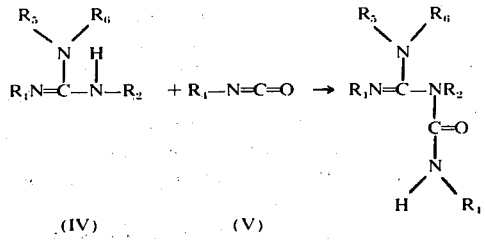

Where $R_3$ and $R_4$ are the same or different without restrictions as to hydrogen, the p-nitrophenyl ester (VI) is reacted with the appropriately substituted amine (VII) to form the compounds of the invention

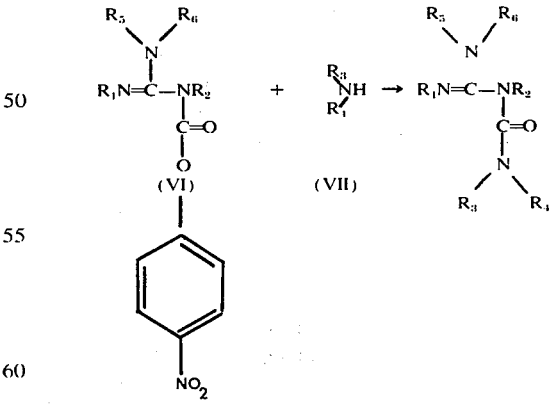

Where $R_3$ and $R_4$ are the same as $R_5$ and $R_6$, an alternate route for preparing compounds of this invention is to react the appropriately substituted carbodiimide (II) with phosgene, followed by the reaction of that product with the appropriately substituted amine.

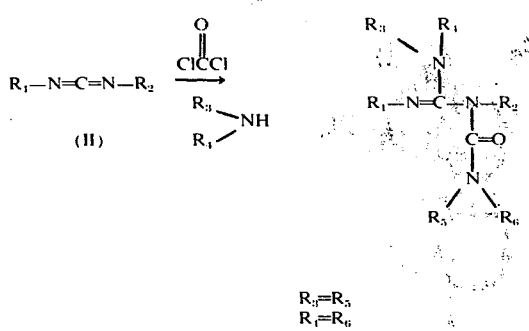

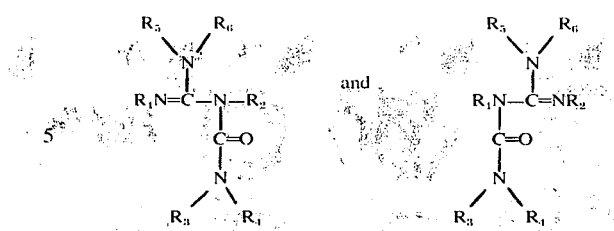

Reaction conditions for the above reactions and other synthetic procedures for preparing the guanidines are those known from the art. For example, various procedures for preparing carbodiimides are outlined in F. Kurzer and K. Douraghi-Zadeh, Chem. Rev. 67, 107 (1967). Page 119 of the review article has a list of references for addition of primary and secondary amines to carbodiimides.

When $R_1$ and $R_2$ are different, tautomers are formed due to the mobility of the double bond. Consequently, these compounds can exist in two forms.

An additional reference for preparing guanidines from which compounds of the invention are prepared is German Pat. No. 1,192,453. Actual addition of the isocyanate to the guanidine or reaction of the p-nitrophenyl ester derivative (VI) of the guanidine with the amine are both reactions well known in the art and suitable conditions for the amine involved are known or readily available.

Compounds illustrative of the invention are the following:

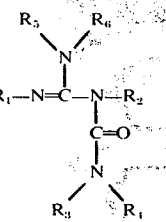

TABLE I

| $R_1$ | $R_2$ | $R_3$ | $R_4$ | $R_5$ $R_6$ |
|---|---|---|---|---|
|  |  | H | $CH_3$ | 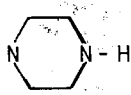 |
|  |  | H | H | 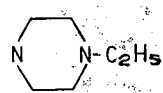 |
|  |  | H | $iC_3H_7$ | 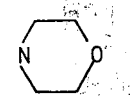 |
|  |  | $C_2H_5$ | $C_6H_{13}$ | 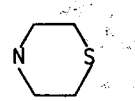 |
|  |  | $C_3H_7$ | $iC_5H_{11}$ |  |
|  |  | $C_2H_5$ |  | 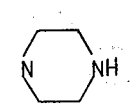 |
|  |  | | |  |
|  |  | | H | 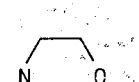 |
| |  | $C_4H_9$ | | |

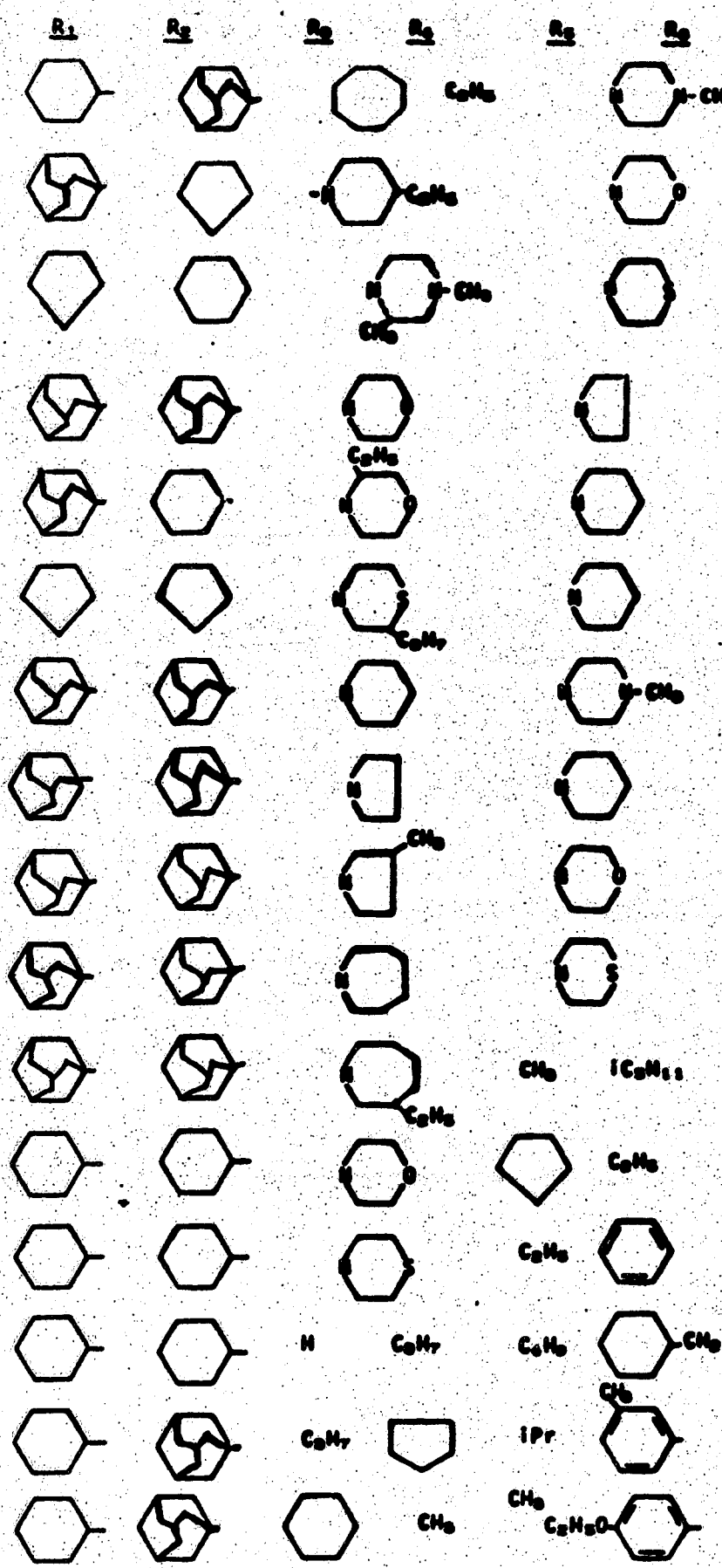

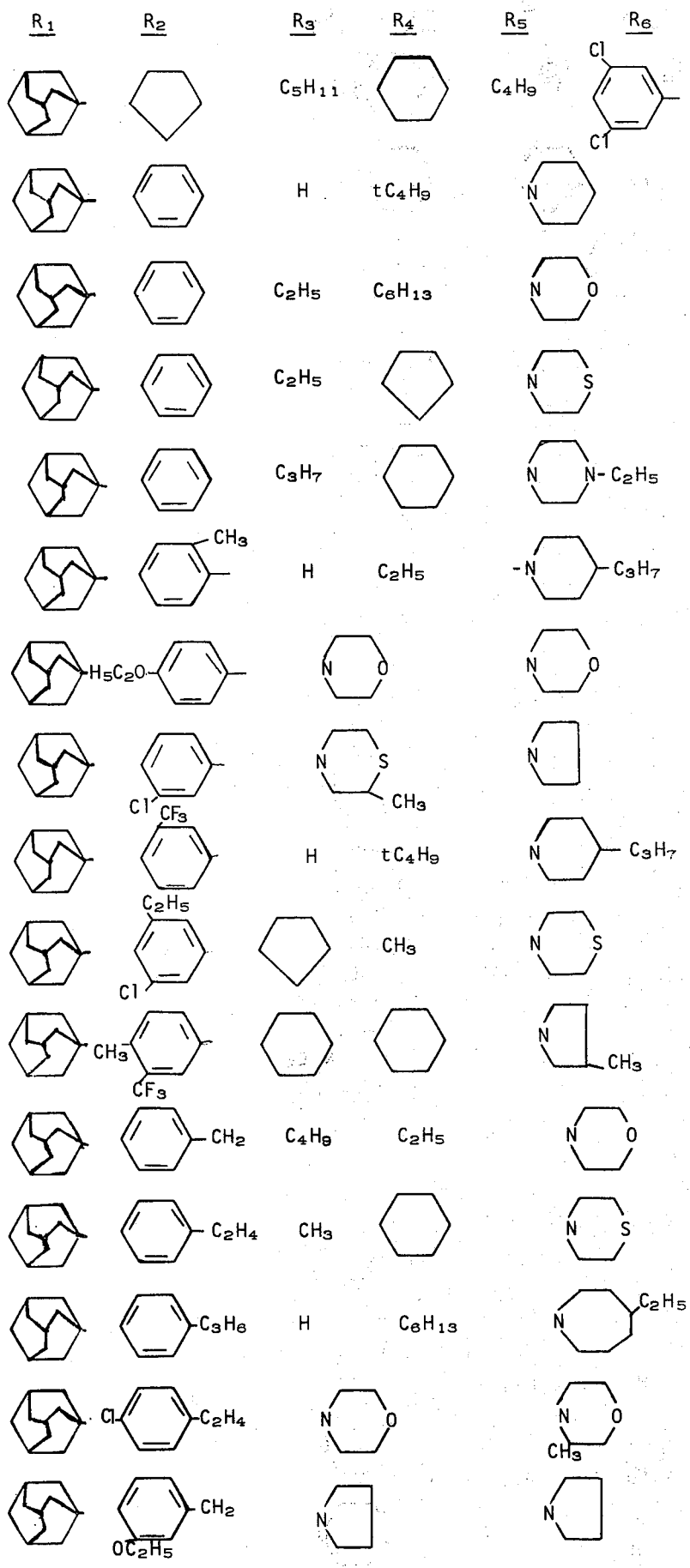

| R₁ | R₂ | R₃ | R₄ | R₅ | R₆ |
|---|---|---|---|---|---|
| adamantyl | 3-CH₃, 5-CF₃ phenyl-C₃H₆ | H | CH₃ | morpholino | |
| adamantyl-CH₃ | 3-CH₃O, 5-OCH₃ phenyl-CH₂ | C₂H₅ | cyclopentyl | azepanyl | |
| cyclohexyl | cyclohexyl | morpholino | | morpholino | |
| cyclohexyl | cyclohexyl | H | CH₃ | thiomorpholino | |
| cyclohexyl | cyclopentyl | C₂H₅ | cycloheptyl | 3-methylpyrrolidinyl | |
| cyclohexyl | cyclooctyl | cyclopentyl | H | 4-propylpiperazinyl | |
| cyclohexyl | adamantyl | C₂H₅ | iC₅H₁₁ | azocanyl | |
| cyclohexyl | adamantyl | H | C₆H₁₃ | morpholino | |
| cyclohexyl | adamantyl | pyrrolidinyl | | 4-methylpiperazinyl | |
| phenyl | phenyl | H | C₃H₇ | morpholino | |
| phenyl | phenyl | C₂H₅ | iC₅H₁₁ | 3-ethylpyrrolidinyl | |
| phenyl | phenyl | C₄H₉ | cyclohexyl | 4-ethylpiperazinyl | |
| phenyl | phenyl | cyclohexyl | cyclohexyl | 3-methylpiperidinyl | |
| phenyl | phenyl | morpholino | | piperidinyl | |
| phenyl | C₂H₅ | H | C₅H₁₁ | thiomorpholino | |
| phenyl | cyclopentyl | C₂H₅ | C₂H₅ | 3-methylmorpholino | |
| phenyl | phenyl | H | H | morpholino | |

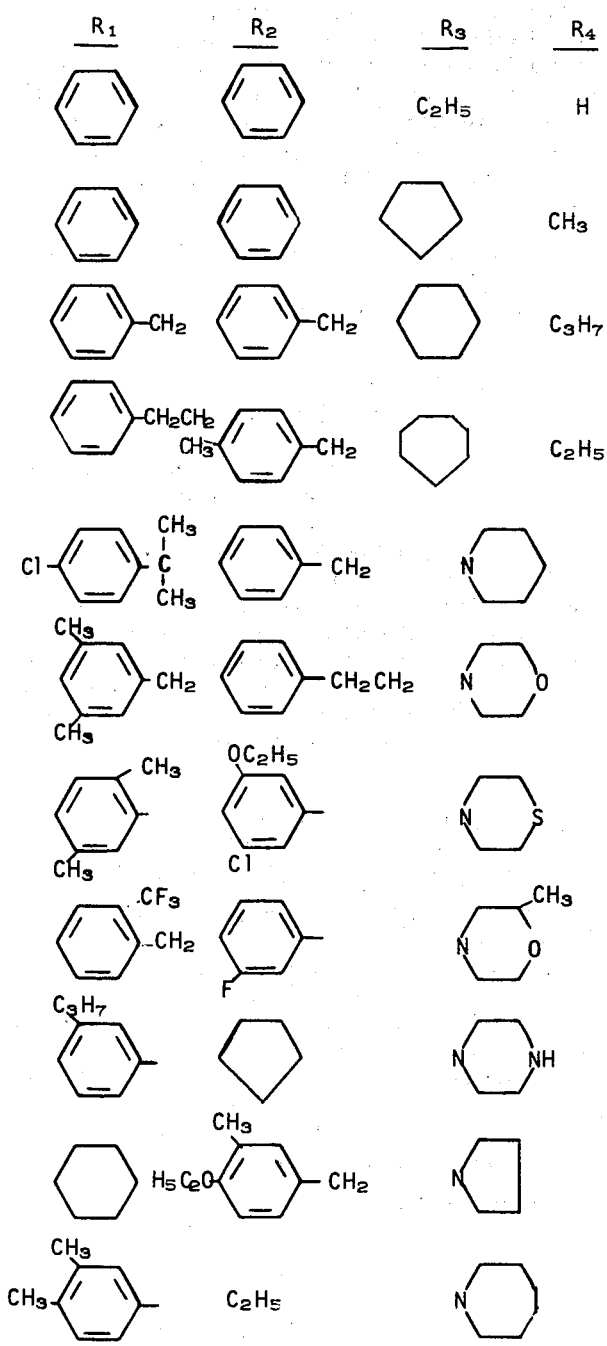
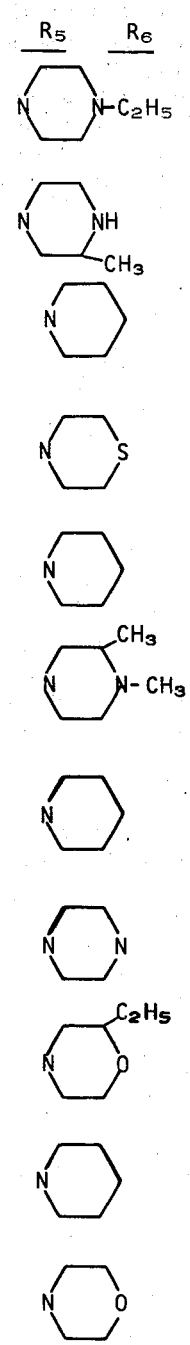

Following are specific examples of compounds within the invention and methods of preparing them. These examples are not intended to be limitations upon the broad scope of the invention, but merely illustrative of this scope.

EXAMPLE
1—N-Cyclohexyl-N-(N-cyclohexyl-4-morpholinecarboximidoyl)-1-pyrrolidinecarboxamide sulfate (1:1)

a.
N-(N-Cyclohexyl-4-morpholinecarboximidoyl)-cyclohexanecarbamic acid p-nitrophenyl ester A solution of 20 gm. (0.1 mole) of p-nitrophenyl chloroformate in 250 ml. of dry benzene is added over thirty minutes to a solution of 60 gm. (0.205 mole) of N,N'-dicyclohexyl-4-morpholinecarboxamidine in 500 ml. of dry benzene stirred at reflux. The reaction is stirred at reflux for four hours and left at room temperature overnight. The suspension is diluted with ether, filtered and the filtrate evaporated. The residue is triturated with 300 ml. of absolute alcohol, product collected and washed with 300 ml. of Skellysolve B to yield 45 gm. (98%) of product, m.p. 159–162. The analytical sample is recyrstallized from Skellysolve B, m.p. 161–162.

Anal. Calcd. for: $C_{24}H_{34}N_4O_5$.
C, 62.86; H, 7.47; N, 12.22.
Found: C, 62.86; H, 7.46; N, 12.22.

b. Product

A mixture of 5.0 gm. (0.0109 mole) of N-(N-cyclohexyl-4-morpholinecarboximidoyl)cyclohexanecarbamic acid p-nitrophenyl ester and 25 ml. of pyrrolidine is heated at reflux for twenty hours. Excess pyrrolidine is evaporated and the residue partitioned between 10% hydrochloric acid and ether-methylene chloride. The acid layer is combined with aqueous extracts of the organic layer; basified with sodium carbonate solution and product extracted into ether. The ether layer is dried ($K_2CO_3$), concentrated and the residue crystallized from pentane 1.6 gm. (38%), m.p. 123–124.

Anal. Calcd. for: $C_{22}H_{38}N_4O_2$.
C, 67.65; H, 9.81; N, 14.35.
Found: C, 67.50, H, 9.84; N, 14.13.

A sample of the free base (6.2 gm.) is converted to the sulfate salt. The sulfate is recrystallized from methanol-ether; 5.25 gm., m.p. 210-211.
Anal. Calcd. for: $C_{22}H_{38}N_4O_2 \cdot H_2SO_4$.
C, 54.07; H, 8.25; N, 11.47.
Found: C, 54.04; H, 8.24; N, 11.21.

EXAMPLE
2—N-Cyclohexyl-N-(N-cyclohexyl-4-morpholinecarboximidoyl)-4-morpholinecarboxamide To a solution of 21 gm. (0.102 mole) of N,N'-dicyclohexylcarbodiimide in 250 ml. of tetrahydrofuran at 0–5° is added dropwise a cold solution of 12 gm. (0.12 mole) of phosgene in 200 ml. of tetrahydrofuran over fifteen minutes, and the reaction stirred for thirty minutes at 0–5°. The solvent is concentrated in vacuo at 30°. To the residue is added 400 ml. of acetonitrile and then a solution of 35 gm. (0.4 mole) of morpholine in 100 ml. of acetonitrile is added over twenty minutes at room temperature with cooling when necessary to maintain a reaction temperature of 20°–30°. The resulting suspension is stirred for one hour, then heated at reflux for 1.5 hr. The solution is evaporated to a residue which is suspended in cold water and extracted with ether. The insoluble interface is collected and recrystallized from acetonitrile to give 4.2 gm. of 1,3-dicyclohexyl-1-morpholinecarbonyl urea, m.p. 163–166. Evaporation of the dried ether layer gives 3.7 gm. of additional material, m.p. 166–168.

The aqueous layer is basified with 2N sodium hydroxide solution and extracted with ether. The dried ether layer is concentrated in vacuo to an oil. The crude hydrochloride salt is prepared by treating an acetone solution of this oil with ethereal hydrogen chloride and dilution with ether. This salt is contaminated with morpholine hydrochloride. The salt is converted to the free base; toluene added and concentrated to remove excess morpholine and the free base recrystallized twice from Skellysolve B at −20°; 0.90 gm. (2.2%), m.p. 92–95.

Anal. Calcd. for: $C_{22}H_{38}N_4O_3$.
C, 64.99; H, 9.42; N, 13.78.
Found: C, 64.78; H, 9.32; N, 13.56.

EXAMPLE 3
3-Tert-butyl-1-cyclohexyl-1-(N-cyclohexyl-4-morpholinecarboximidoyl)urea hydrochloride To a solution of 100 gm. (0.34 mole) of N,N'-dicyclohexyl-4-morpholinecarboxamidine in 3 l. of dry ether is added over ten minutes a solution of 38 gm. (0.38 mole) of tert-butyl isocyanate. The reaction is stirred at room temperature for twenty-four hours, filtered and the filtrate evaporated to a volume of about 750 ml. After addition of 500 ml. of acetone, the solution is treated with a 25% excess of ethereal hydrogen chloride. The hydrochloride is collected and dried to yield 103 gm. of product which is recrystallized from 1800 ml. of acetonitrile to give 80.0 gm. (55%), m.p. 190-194.

Anal. Calcd. for: $C_{22}H_{40}N_4O_2 \cdot HCl$.
C, 61.58; H, 9.63; N, 13.06; Cl, 8.26.
Found: C, 61.30; H, 9.79; N, 12.70; Cl, 8.22.

Concentration of filtrates gives an additional yield of 26.1 gm. (18%) of the hydrochloride salt.

A sample of the above hydrochloride (20 gm.) is converted to the free base by treatment with sodium carbonate solution and extraction of the product into ether. The dried ($Na_2SO_4$) ether layer is evaporated to an oil which is crystallized from ethanol-water; 9.3 gm., m.p. 82°–87°.

In a manner similar to the above methods, the following compounds of this invention are prepared:

TABLE II

| $R_1$ | $R_2$ | $R_3$ | $R_4$ | $R_5$ $R_6$ | Melting Point |
|---|---|---|---|---|---|
|  |  | $CH_3$ | H |  | )base 159-160<br>)HCl 202-203 |
|  |  | $CH_3CH_2CH_2CH_2-$ | H |  | )base 108-110<br>)HCl 191-193 |
|  |  |  | H |  | )base 108-110<br>)HCl 221-223 |
|  |  | $CH_3$ | $CH_3$ |  | - 135-136 |
|  |  | H | H |  | - 146-148 |
|  |  | $CH_3-\underset{\underset{CH_3}{\mid}}{\overset{\overset{CH_3}{\mid}}{C}}-$ | H |  | - 207-208 |
|  |  | | - | | - 118-120 |

The compositions of the present invention are presented for administration to humans and animals in unit dosage forms such as tablets, capsules, pills, powders, granules, sterile parenteral solutions or suspensions, oral solutions or suspensions, and oil-in-water and water-in-oil emulsions and suppositories containing suitable quantities of the compound.

For oral administration, either solid or fluid unit dosage forms can be prepared. For preparing solid compositions such as tablets, the compound of Formula I is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. Capsules are prepared by mixing the compound with an inert pharmaceutical diluent and filling the mixture into a hard gelatin capsule of appropriate size. Soft gelatin capsules are prepared by machine encapsulation of a slurry of the compound with an acceptable vegetable oil, light liquid petrolatum or other inert oil.

Fluid unit dosage forms for oral administration such as syrups, elixirs, and suspensions can be prepared. The water-soluble forms can be dissolved in an aqueous vehicle together with sugar, aromatic flavoring agents and preservatives to form a syrup. An elixir is prepared by using a hydroalcoholic (ethanol) vehicle with suitable sweetners such as sugar and saccharin, together with an aromatic flavoring agent.

Suspensions can be prepared with an aqueous vehicle with the aid of a suspending agent such as acacia, tragacanth, methylcellulose and the like.

For parenteral administration, fluid unit dosage forms are prepared utilizing the compound and a sterile vehicle, water being preferred. The compound, depending on the vehicle and concentration used, can be either suspended or dissolved in the vehicle. In preparing solutions the compound can be dissolved in water for injection and filter sterilized before filling into a suitable vial or ampul and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the liquid prior to use. Parenteral suspensions are prepared in substantially the same manner except that the compound is suspended in the vehicle instead of being dissolved and sterilization cannot be accomplished by filtration. The compound can be sterilized by exposure to ethylene oxide before suspending in the sterile vehicle. Advantageously, a surfactant or wetting agent is included in the composition to facilitate uniform distribution of the compound. Compositions can be administered intramuscularly andd intravenously, for example.

The term "unit dosage form", as used in the specification and claims, refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular effect to be achieved and (b) the limitations inherent in the art of compounding such an active material for use in humans and animals, as disclosed in detail in this specification, these being features of the present invention. Examples of suitable unit dosage forms in accord with this invention are tablets, capsules, pills, powder packets, wafers, granules, cachets, teaspoonfuls, tablespoonfuls, dropperfuls, ampuls, vials, suppositories, segregated multiples of any of the foregoing, and other forms as herein described.

The administration of the pharmaceutical composition of the present invention to humans and animals bring about cardioregulatory action. Arrhythmias such as auricular fibrillation, ventricular fibrillation, paroxysmal atrial or ventricular tachycardia and the like can be treated by this invention. Additionally, the compounds of the invention are useful as diuretics. As such, they have the property of augmenting both urine volume and sodium excretion. This effect is of particular significance when the mammal suffering cardiac abnormalities, for example, arrhythmia, also has a build-up of bodily fluids.

For treating cardioregulatory problems such as arrhythmia, an effective dosage of the particular compound is used. The particular dosage of the compound for treatment depends on the route of administration and the potency of the particular compound. For treating arrhythmia in mammals orally, the dosage is from about 10 to about 1000 mg. per day in one to four equally divided doses. A preferred dosage range is from about 40 to about 400 mg. per day. Diuresis can be observed in the range of from about 1 to about 1000 mg. per day, preferably 10 to about 500 mg. per day. For treating arrhythmia in mammals parenterally, the dosage is from about 1 to about 500 mg. per day in one to four equally divided doses. A preferred dosage range is from about 10 to about 200 mg. per day. Diuresis can be observed in the range of from about 1 to about 500 mg. per day, preferably from about 10 to about 200 mg. parenterally. Oral and rectal doses are similar.

Example 4

A lot of 10,000 tablets, each containing 100 mg. of 3-tert-butyl-1-cyclohexyl-1-(N-cyclohexyl-4-morpholinecarboximidoyl)urea hydrochloride is prepared from the following types and amounts of ingredients:

| | |
|---|---|
| 3-tert-butyl-1-cyclohexyl-1-(N-cyclohexyl-4-morpholine-carboximidoyl)urea hydrochloride | 1,000 Gm. |
| Dicalcium phosphate | 1,000 Gm. |
| Methylcullulose, U.S.P. (15 cps) | 60 Gm. |
| Talc | 150 Gm. |
| Corn starch | 200 Gm. |
| Magnesium stearate | 10 Gm. |

The compound and dicalcium phosphate are mixed well, granulated with 7.5 percent solution of methylcellulose in water, passed through a No. 8 screen and dried carefully. The dried granules are passed through a No. 12 screen, mixed thoroughly with the talc, starch and magnesium stearate, and compressed into tablets.

These tablets are useful in treating auricular fibrillation in man at a dose of 1 tablet 4 times a day.

EXAMPLE 5

One thousand two-piece hard gelatin capsules, each containing 10 mg. of N-Cyclohexyl-N-(N-cyclohexyl-4-morpholinecarboximidoyl)-4-morpholinecarboxamide are prepared from the following types and amounts off ingredients:

| | |
|---|---|
| N-Cyclohexyl-N-(N-cyclohexyl-4-morpholinecarboximidoyl)-4-morpholinecarboxamide | 10 Gm. |
| Dicalcium Phosphate | 150 Gm. |
| Talc | 15 Gm. |
| Magnesium stearate | 1 Gm. |

The ingredients are mixed well and filled into capsules of the proper size.

Capsules so prepared are useful in preventing paroxysmal tachycardia at a dose of one capsule every four hours.

EXAMPLE 6

One thousand tablets, each containing 300 mg. of 3-tert-butyl-1-cyclohexyl-1-(N-cyclohexyl-4-morpholinecarboximidoyl)urea hydrochloride are prepared from the following types and amounts of ingredients:

| | |
|---|---|
| 3-tert-butyl-1-cyclohexyl-1-(N-cyclohexyl-4-morpholinecarboximidoyl)urea hydrochloride | 300 Gm. |
| Microcrystalline cellulose NF | 410 Gm. |
| Starch | 100 Gm. |
| Magnes stearate powder | 4 Gm. |

The ingredients are screened and blended together and pressed into 814 mg. tablets.

The tablets are useful in treating auricular fibrillations in man at a dose of one tablet three times a day.

EXAMPLE 7

One thousand tablets, each containing 125 mg. of 3-tert-butyl-1-cyclohexyl-1-(N-cyclohexyl-4-morpholinecarboximidoyl)urea hydrochloride are prepared from the following types and amounts of ingredients:

| | |
|---|---|
| 3-tert-butyl-1-cyclohexyl-1-(N-cyclohexyl-4-morpholinecarboximidoyl)urea hydrochloride | 125 Gm. |
| Microcrystalline cellulose NF | 410 Gm. |
| Starch | 100 Gm. |
| Magnesium stearate powder | 3 Gm. |

The ingredients are screened and blended together and pressed into 638 mg. tablets.

The tablets are useful in treating paroxysmal tachycardia and an increased fluid retention at a dose of 4 tablets per day.

EXAMPLE 8

A sterile preparation suitable for intramuscular injection and containing 25 mg. of N-cyclohexyl-N-(N-cyclohexyl-4-morpholinecarboximidoyl)-1-pyrrolidinecarboxamide sulfate (1:1) in each milliliter is prepared from the following ingredients:

| | | |
|---|---|---|
| N-cyclohexyl-N-(N-cyclohexyl-4-morpholinecarboximidoyl)-1-pyrrolidinecarboxamide sulfate (1:1) | 25 | Gm. |
| Benzyl benzoate | 200 | ml. |
| Methylparaben | 1.5 | Gm. |
| Propylparaben | 0.5 | Gm. |
| Cottonseed oil q.s. | 1,000 | ml. |

One milliliter of this sterile preparation is injected 4 times daily for the treatment of auricular fibrillation.

EXAMPLE 9

A sterile preparation suitable for intramuscular injection and containing 25 mg. of N-cyclohexyl-N-(N-cyclohexyl-4-morpholinecarboximidoyl)-4-morpholinecarboxamide in each milliliter is prepared from the following ingredients:

| | | |
|---|---|---|
| N-Cyclohexyl-N-(N-cyclohexyl-4-morpholinecarboximidoyl)-4-morpholinecarboxamide | 25 | Gm. |
| Benzyl benzoate | 200 | ml. |
| Methylparaben | 1.5 | Gm. |
| Propylparaben | 0.5 | Gm. |
| Cottonseed oil q.s. | 1,000 | ml. |

Two milliliters of this sterile preparation is injected 4 times daily for treatment of paroxysmal tachycardia.

Example 10

A sterile preparation suitable for intramuscular injection and containing 200 mg. of 3-tert-butyl-1-cyclohexyl-1-(N-cyclohexyl-4-morpholinecarboximidoyl)urea hydrochloride in each milliliter is prepared from the following ingredients:

| | | |
|---|---|---|
| 3-tert-butyl-1-cyclohexyl-1-(N-cyclohexyl-4-morpholinecarboximidoyl)urea hydrochloride | 200 | Gm. |
| Benzyl benzoate | 200 | ml. |
| Methylparaben | 1.5 | Gm. |
| Propylparaben | 0.5 | Gm. |
| Cottonseed oil q.s. | 1000 | ml. |

One milliliter of this sterile preparation is injected 4 times daily for treatment of auricular fibrillation and retention of bodily fluids.

EXAMPLE 11

Suitable quantities of the compounds of Tables I and II are compounded as in Examples 4–10 and used in a manner similar to the uses of Examples 4–10.

A rectal suppository can be employed to deliver the active compound where the mammal cannot be treated conveniently by means of other dosage forms, such as orally, as in the case of young children or debilitated persons. The active compound can be incorporated into any of the known suppository bases by methods known in the art. Examples of such bases include cocoa butter, polyethylene glycols (Carbowaxes), polyethylene sorbitan monostearate, and mixtures of these with other compatible materials to modify the melting point or dissolution rate. These rectal suppositories can weigh from about 1 to 2.5 Gm.

We claim:

1. Compounds of the formula $$\begin{array}{c} R_5 \quad R_6 \\ \diagdown \quad \diagup \\ N \\ | \\ R_1N\!=\!C\!-\!NR_2 \\ | \\ C\!=\!O \\ | \\ N \\ \diagup \quad \diagdown \\ R_3 \quad R_4 \end{array}$$

wherein

R₁ and R₂ are the same or different and are selected from the group consisting of alkyl of from one to eight carbon atoms, inclusive, cycloalkyl of from five to eight carbon atoms, inclusive, adamantyl, phenalkyl wherein alkyl is from one to three carbon atoms, inclusive, phenyl and mono or disubstituted phenyl or phenyl moiety of the phenalkyl wherein the substituent is the same or different and is selected from the group consisting of alkyl of from one to three carbon atoms, inclusive, halogen, trifluoromethyl, and alkoxy of one to three carbon atoms, inclusive;

R₃ and R₄ are the same or different and are selected from the group consisting of hydrogen, alkyl of from one to six carbon atoms, inclusive, cycloalkyl of from five to eight carbon atoms, inclusive;

R₅ and R₆, together with the nitrogen atom to which they are attached, form a saturated heterocyclic ring, N/W, wherein W is selected from the group consisting of carbon, NA where N is nitrogen and A is hydrogen or alkyl of one to three carbon atoms, oxygen and sulfur, and when W is carbon, N/W has from four to six ring carbon atoms, inclusive, and when W is selected from the group consisting of NA as previously defined, oxygen and sulfur, N/W is respectfully piperazino, N-alkylpiperazino, morpholino, and thiomorpholino, with the further proviso that the carbon ring of N/W is unsubstituted or mono-substituted with an alkyl of from one to three carbon atoms, inclusive, and their pharmaceutically acceptable acid addition salts.

2. 3-Tert-butyl-1-cyclohexyl-1-(N-cyclohexyl-4-morpholinecarboximidoyl)urea hydrochloride according to claim 1.

3. N-cyclohexyl-N-(N-cyclohexyl-4-morpholinecarboximidoly-1-pyrrolidinecarboxamide sulfate in accordance with claim 1.

4. N-Cyclohexyl-N-(N-cyclohexyl-4-morpholinecarboximidoyl)-4-morpholinecarboxamide in accordance with claim 1.

5. 3-Methyl-1-cyclohexyl-1-(N-cyclohexyl-4-morpholinecarboximidoyl)urea in accordance with claim 1.

6. 3-Methyl-1-cyclohexyl-1-(N-cyclohexyl-4-morpholinecarboximidoyl)urea hydrochloride in accordance with claim 1.

7. 3-Butyl-1-cyclohexyl-1-(N-cyclohexyl-4-morpholinecarboximidoyl)urea in accordance with claim 1.

8. 3-Butyl-1-cyclohexyl-1-(N-cyclohexyl-4-morpholinecarboximidoyl)urea hydrochloride in accordance with claim 1.

9. 1,3-Dicyclohexyl-1-(N-cyclohexyl-4-morpholinecarboximidoyl)urea in accordance with claim 1.

10. 1,3-Dicyclohexyl-1-(N-cyclohexyl-4-morpholinecarboximidoyl)urea hydrochloride in accordance with claim 1.

11. 3,3-Dimethyl-1-cyclohexyl-1-(N-cyclohexyl-4-morpholinecarboximidoyl)urea in accordance with claim 1.

12. 1-Cyclohexyl-1-(N-cyclohexyl-4-morpholinecarboximidoyl)urea in accordance with claim 1.

13. 3-tert-Butyl-1-cyclohexyl-1-(N-cyclohexyl-1-pyrrolidinecarboximidoyl)urea hydrochloride in accordance with claim 1.

* * * * *

UNITED STATES PATENT OFFICE
CERTIFICATE OF CORRECTION

Page 1 of 2

Patent No. 3,903,084          Dated  September 2, 1975

Inventor(s) Donald W. DuCharme and Louis L. Skaletsky

It is certified that error appears in the above-identified patent and that said Letters Patent are hereby corrected as shown below:

NOTE: "$R_4$" throughout the whole patent is faint.

Column 1, line 17, "$R_5$" is faint; Column 4, Formula VI:

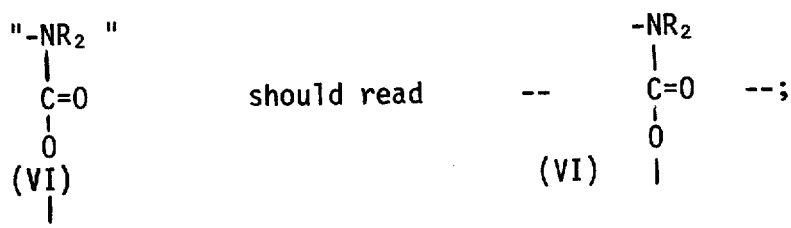

Column 4, Formula VII: 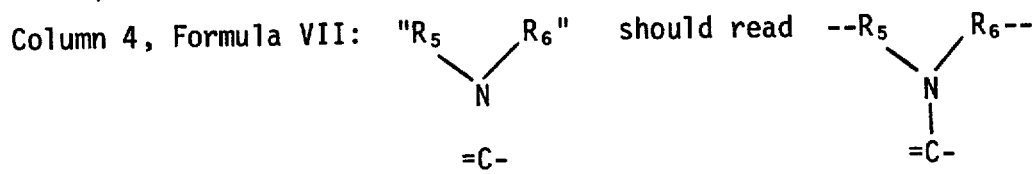

Column 15, line 17: "$C_{22}H_{38}N_4O_2 \cdot H_2SO_4$" should read --$C_{22}H_{38}N_4O_2 \cdot H_2SO_4$--;
Colunn 16, line 31, "$C_{22}H_{40}N_4O_2 \cdot HCl$" should read --$C_{22}H_{40}N_4O_2 \cdot HCl$--;
Column 17, line 28, "sweetners" should read --sweeteners--; line 58, "andd" should read --and--; Column 18, line 52, "methylcullulose" should read

UNITED STATES PATENT OFFICE

CERTIFICATE OF CORRECTION

Patent No. 3,903,084   Dated September 2, 1975

Inventor(s) Donald W. DuCharme and Louis L. Skaletzky

It is certified that error appears in the above-identified patent and that said Letters Patent are hereby corrected as shown below:

--Methylcellulose--; Column 19, line 3, "off" should read --of--; line 30, "Magnes" should read --Magnesium--; Column 21, line 20, "N/W" should read --$(\frac{W}{N})$--; line 24, "N/W" should read --$(\frac{W}{N})$--; line 27, "N/W" should read --$(\frac{W}{N})$--; line 30, "N/W" should read --$(\frac{W}{N})$--; Column 22, line 5, "morpholinecarboximidoly)-" should read --morpholinecarboximidoyl)- --.

Signed and Sealed this

Twenty-seventh Day of March 1979

[SEAL]

Attest:

RUTH C. MASON
Attesting Officer

DONALD W. BANNER
Commissioner of Patents and Trademarks